(12) United States Patent
Paturel

(10) Patent No.: US 8,740,120 B2
(45) Date of Patent: Jun. 3, 2014

(54) ROTOR FOR CUTTING FOODSTUFFS INTENDED FOR A FOOD PROCESSOR AND CORRESPONDING APPLIANCE

(75) Inventor: Bruno Paturel, Aubusson (FR)

(73) Assignee: Electrolux Professionel SAS, Senlis (FR)

( * ) Notice: Subject to any disclaimer, the term of this patent is extended or adjusted under 35 U.S.C. 154(b) by 0 days.

(21) Appl. No.: 13/593,624

(22) Filed: Aug. 24, 2012

(65) Prior Publication Data

US 2013/0048772 A1    Feb. 28, 2013

(30) Foreign Application Priority Data

Aug. 25, 2011    (EP) ..................................... 11178748

(51) Int. Cl.
*B02C 4/06*    (2006.01)

(52) U.S. Cl.
USPC ...................................................... 241/282.1

(58) Field of Classification Search
USPC .......................................... 241/282.1, 282.2
See application file for complete search history.

(56) References Cited

U.S. PATENT DOCUMENTS

| | | | |
|---|---|---|---|
| 2,655,354 A | | 10/1953 | Murray |
| 4,180,212 A | * | 12/1979 | Witte ............................ 241/89.4 |
| 5,487,511 A | | 1/1996 | Sansone et al. |
| 6,446,547 B2 | * | 9/2002 | Kubicko et al. ................. 99/467 |
| 6,974,099 B2 | * | 12/2005 | Kolar et al. .................. 241/282.1 |
| 7,278,598 B2 | * | 10/2007 | Katz et al. ................... 241/282.1 |
| 7,552,885 B2 | * | 6/2009 | Katz et al. ................... 241/282.1 |
| 8,132,752 B1 | * | 3/2012 | Hotaling et al. ........... 241/282.1 |
| 2012/0080549 A1 | * | 4/2012 | Rukavina .................... 241/282.1 |

FOREIGN PATENT DOCUMENTS

DE    20 2004 007486    9/2004
EP    1 820 431    8/2007

OTHER PUBLICATIONS

Extended European Search Report issued in corresponding European Application No. 11178748.7, dated Feb. 1, 2012.

* cited by examiner

*Primary Examiner* — Faye Francis
(74) *Attorney, Agent, or Firm* — Banner & Witcoff, Ltd.

(57) ABSTRACT

A rotor (11) for cutting foodstuffs, intended for a food processor, includes: a rotary drive hub (14) and at least one blade (16a, 16b) attached to the hub (14) and extending radially from the latter. The blade (16a, 16b) has a first portion (20a, 20b) with a highly-sharpened leading edge for cutting the foodstuffs and at the end of which is provided a second portion (22a, 22b) with a non-sharpened leading edge for striking the foodstuffs so as to promote their bursting.

13 Claims, 3 Drawing Sheets

ROTOR FOR CUTTING FOODSTUFFS INTENDED FOR A FOOD PROCESSOR AND CORRESPONDING APPLIANCE

CROSS-REFERENCE TO RELATED APPLICATION

This application claims priority to European Application No. 11178748.7, filed Aug. 25, 2011, the content of which is hereby incorporated by reference in its entirety.

BACKGROUND OF THE INVENTION

The present invention relates to a rotor for cutting foodstuffs, for example intended for a food processor and to a corresponding appliance.

The invention more particularly relates to a rotor for cutting foodstuffs, of the type comprising:
a rotary drive hub, and
at least one blade attached to the hub and extending radially from the latter.

Food processors are known, comprising in a receptacle, a rotor equipped with one or more radial cutting blades. The rotor rotates at a very high speed, for example 3,600 rpm. This type of appliance is suitable for rather fine chopping of for example meat, onions, shellfish or ice cubes in typically a few seconds. However, it is difficult or even impossible by means of the rotors of the state of the art to obtain a result of the emulsion type, for example a mayonnaise, a pie dough or even a mousse of vegetables, the obtained grain size being not sufficiently fine.

FIG. 1 illustrates a rotor 1 of the state of the art, intended to rotate about an axis 2 in order to cut foodstuffs. The rotor 1 comprises a rotary drive hub 4 adapted so as to be connected to any suitable driving means and two blades 6a, 6b attached on the hub 4 and extending radially on either side of the hub 4. In the described example, both blades 6a, 6b are located at different levels along the direction of the axis of rotation 2.

Each blade 6a, 6b comprises a highly-sharpened leading edge 8a, 8b, bulging in the direction of the rotation. Each leading edge 8a, 8b has the general shape of a comma.

SUMMARY OF SELECTED INVENTIVE ASPECTS

An object of the invention is to solve the aforementioned problems, i.e. in particular provide a rotor for cutting foodstuffs, with which very fine grain size and consistency of an emulsion may be obtained, such as those required for preparing vegetable mousses.

For this purpose, in an aspect, the invention provides a rotor of the aforementioned type, in which the blade has a first portion with a highly-sharpened leading edge for cutting the foodstuffs and at the end of which is provided a second portion with a hammer-shaped leading edge for striking the foodstuffs so as to promote their bursting.

According to particular embodiments, the rotor may comprise one or more of the following characteristics, taken individually or according to all the technically possible combinations:
the leading edge of the first portion of the blade is conformed so as to promote sliding of the foodstuffs against the leading edge of the second portion of the blade;
the leading edge of the first portion of the blade bulges in the direction of rotation of the rotor;
the leading edge of the second portion of the blade has the shape of a hammer;
the leading edge of the second portion of the blade comprises an oriented surface so that it strikes the foodstuffs in a substantially frontal way;
the leading edge of the second portion of the blade is concave in the direction of rotation of the rotor;
the rotor comprises at least two blades attached on either side of the axes of rotation of the rotor;
said at least two blades are attached symmetrically on either side of the hub;
the hub is overmolded on the corresponding ends of the blades.

According to another aspect, the invention provides a food processor comprising a rotor as described above.

BRIEF DESCRIPTION OF THE DRAWINGS

The invention will be better understood upon reading the description which follows, only given as an example, and made with reference to the appended drawings, wherein.

DETAILED DESCRIPTION OF EXAMPLE EMBODIMENTS

Figure 1:
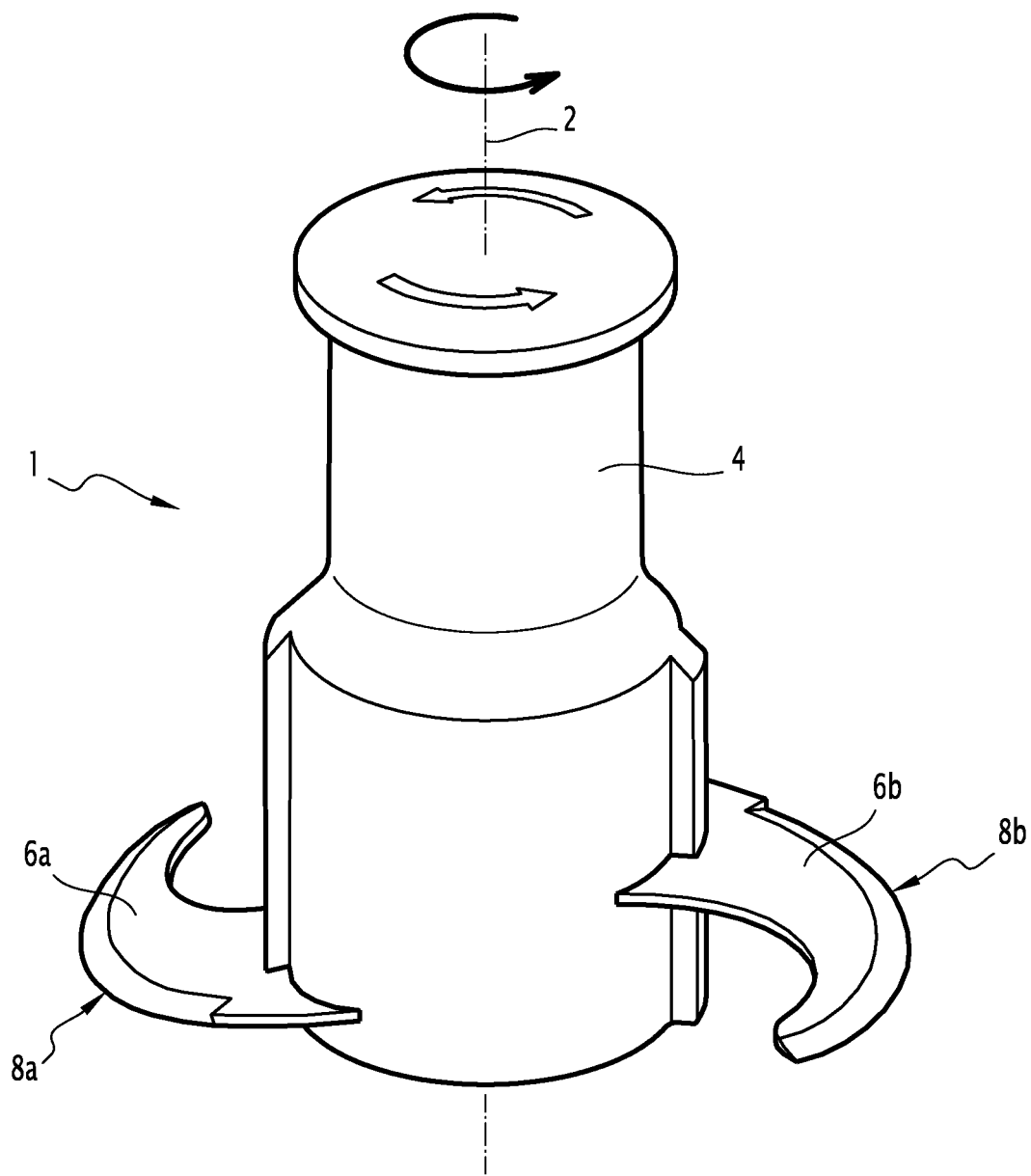
FIG. 1 illustrates as a perspective view a rotor of the state of the art.
Figure 2:
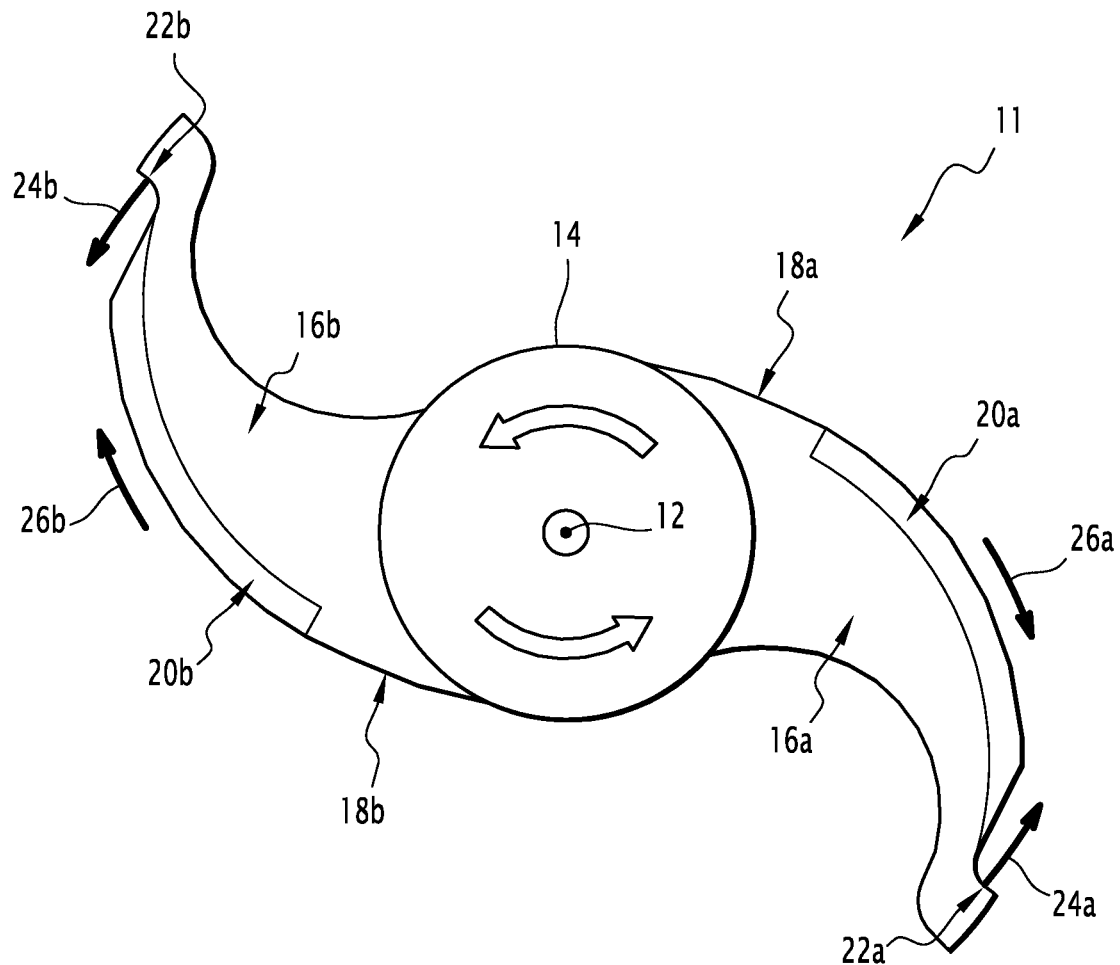
FIG. 2 illustrates a top view of a rotor according to the invention.

FIG. 2 illustrates a rotor 11 according to the invention, intended to rotate about an axis 12 for cutting foodstuffs. The rotor 11 comprises a rotary drive hub 14 and two blades 16a, 16b attached on the hub 14 and extending radially on either side of the hub 14.

Each blade 16a, 16b comprises a leading edge 18a, 18b. Each blade 16a, 16b comprises a first portion 20a, 20b with a highly-sharpened leading edge and a second portion 22a, 22b with a non-sharpened, for example hammer-shaped, leading edge, in order to strike the foodstuffs so as to promote their bursting. The first portion 20a, 20b is closer to the hub 14 than the second portion 22a, 22b. The second portion 22a, 22b is located at the free end of the blade 16a, 16b.

As an example, the rotor 11 has a diameter of the order of 25 cm and the second portion 22a, 22b extends over about 2 cm radially.

The role of the first portion 20a, 20b is to cut the foodstuffs, while that of the second portion 22a, 22b is to strike them along the direction of the arrows 24a, 24b in order to promote their bursting.

Advantageously, the first portions 20a, 20b are conformed so as to promote sliding of the foodstuffs along the direction of the arrows 26a, 26b towards the second portions 22a, 24b. Thus, the cutting efficiency of the highly-sharpened leading edges of the first portions 20a, 20b is reinforced. The foodstuffs are pushed towards the second portions 22a, 22b which will then strike them.

According to a particular embodiment, the leading edges of the first portions 20a, 20b bulge in the direction of the rotation, which improves the sliding effect.

According to another particular embodiment, the leading edges of the second portions 22a, 22b of the blades 16a, 16b each comprise a preferably flat surface, oriented so as to strike the foodstuffs in a substantially frontal way. In other words, these surfaces are substantially orthogonal to the directions materialized by the arrows 24a and 24b. The arrows 24a and 24b are themselves oriented respectively along the direction of the velocity vectors of the second portions 22a, 22b when the rotor 11 is rotating.

According to another particular embodiment, the leading edges of the second portions 22a, 22b are concave in the direction of the rotation, which reinforces the striking effect of the second portions 22a, 22b.

The blades 16a, 16b may be attached symmetrically on either side of the axis 12 which allows balancing of the rotor 11 rotating about the axis 12.

According to an alternative (not shown), one of the blades 16a, 16b may be a blade from the state of the art, not having a second portion with a non-sharpened leading edge.

Advantageously, the hub 14 is overmolded on the corresponding ends of the blades 16a, 16b.

The rotor 11 may naturally be placed in any food preparation appliance known as a food processor, for example a vegetable mill.

Figure 3:
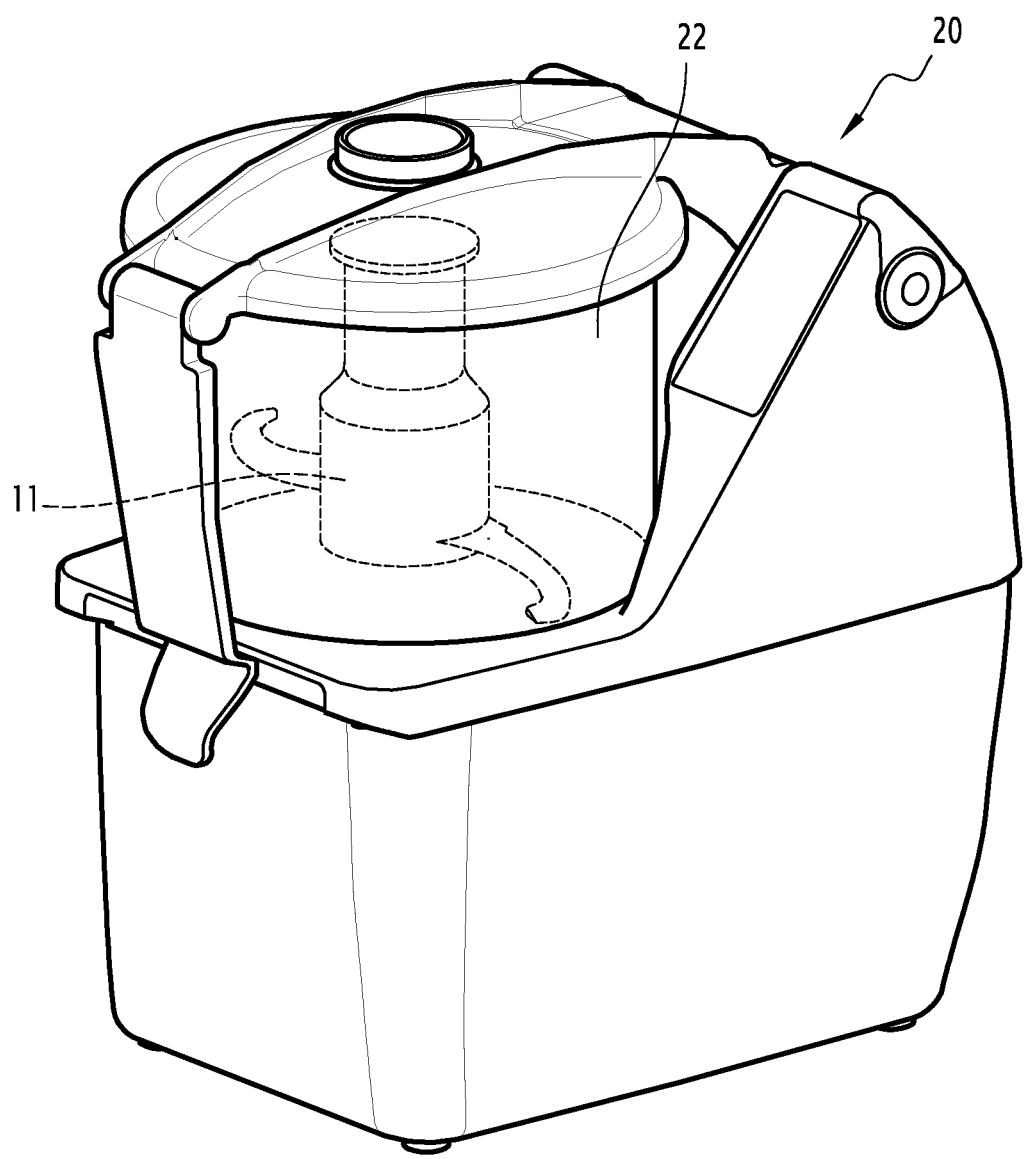
FIG. 3 is a view of a food processor intended to receive the rotor illustrated in FIG. 2.

A vegetable mill 20, comprising a receptacle 22, intended to receive the rotor 11 is illustrated in FIG. 3.

By means of the second portions 22a, 22b of the blades 16a, 16b, the rotor 11 according to the invention gives the possibility of obtaining very fine grain size and emulsion consistency, such as those required for preparing vegetable mousses.

The conformation of the highly-sharpened leading edges of the first portions 20a, 20b reinforces this effect by pushing the foodstuffs towards the second portion 22a, 22b.

The invention has been described in terms of particular exemplary embodiments. Numerous other embodiments, modifications and variations within the scope and spirit of the invention as defined in the appended claims will occur to persons of ordinary skill in the art from a review of this disclosure.

The invention claimed is:

1. A rotor for cutting foodstuffs, intended for a food processor, comprising:
    a rotary drive hub, and
    at least one blade attached to the hub and extending radially from the latter, wherein the blade has a first portion with a sharpened leading edge for cutting the foodstuffs and a second portion located at the free end of the blade with a non-sharpened leading edge having a frontal surface that lies at least partially within a common plane of rotation with the sharpened leading edge for striking the foodstuffs so as to promote their bursting.

2. The rotor according to claim 1, wherein the leading edge of the first portion of the blade bulges in the direction of rotation of the rotor.

3. The rotor according to claim 2, wherein the leading edge of the second portion of the blade has a flat surface.

4. The rotor according to claim 1, wherein the frontal surface of the second portion of the blade comprises a surface that is substantially orthogonal to the direction of the velocity vector of the second portion when the rotor is rotating.

5. The rotor according to claim 4, wherein the frontal surface of the second portion of the blade is concave in the direction of rotation of the rotor.

6. The rotor according to claim 1, wherein the leading edge of the second portion of the blade has a flat surface.

7. The rotor according to claim 1, comprising at least two blades attached on either side of the axis of rotation of the rotor.

8. The rotor according to claim 7, wherein said at least two blades are attached and configured symmetrically on either side of the hub.

9. The rotor according to claim 7, wherein the hub is overmolded on corresponding inner ends of the blades.

10. A food processor comprising a food receptacle, and a rotor according to claim 1 rotatably mounted within said receptacle.

11. A food processor comprising a food receptacle, and a rotor according to claim 3 rotatably mounted within said receptacle.

12. The food processor according to claim 11, comprising at least two blades attached on either side of the axis of rotation of the rotor.

13. The food processor according to claim 12, wherein said at least two blades are attached and configured symmetrically on either side of the hub.

* * * * *